United States Patent
Weldy

(10) Patent No.: US 9,649,967 B2
(45) Date of Patent: May 16, 2017

(54) VEHICLE LOWERING SYSTEM

(71) Applicant: Ross Weldy, Bristol, IN (US)

(72) Inventor: Ross Weldy, Bristol, IN (US)

( * ) Notice: Subject to any disclaimer, the term of this patent is extended or adjusted under 35 U.S.C. 154(b) by 0 days.

(21) Appl. No.: 15/163,754

(22) Filed: May 25, 2016

(65) Prior Publication Data

US 2016/0264031 A1 Sep. 15, 2016

Related U.S. Application Data

(63) Continuation-in-part of application No. 14/581,459, filed on Dec. 23, 2014, now Pat. No. 9,352,678.

(51) Int. Cl.
| | |
|---|---|
| *B60G 17/00* | (2006.01) |
| *B60P 1/08* | (2006.01) |
| *B60P 1/43* | (2006.01) |
| *B60G 7/00* | (2006.01) |
| *B60P 1/02* | (2006.01) |
| *B60G 11/22* | (2006.01) |
| *B60G 17/017* | (2006.01) |
| *B60G 17/027* | (2006.01) |

(52) U.S. Cl.
CPC ............. *B60P 1/08* (2013.01); *B60G 7/001* (2013.01); *B60G 11/225* (2013.01); *B60G 17/017* (2013.01); *B60G 17/027* (2013.01); *B60P 1/027* (2013.01); *B60P 1/431* (2013.01); *B60G 2300/38* (2013.01); *B60G 2800/203* (2013.01)

(58) Field of Classification Search
CPC B60G 17/017; B60G 17/027; B60G 2300/38; B60G 2800/203; B60P 1/08; B60P 1/431; B60P 1/027
USPC ............... 280/6.151, 6.153, 53.11, 414.1
See application file for complete search history.

(56) References Cited

U.S. PATENT DOCUMENTS

| | | | | |
|---|---|---|---|---|
| 5,975,828 | A * | 11/1999 | Weldy ..................... | B60P 1/08 414/484 |
| 6,135,700 | A * | 10/2000 | Collins ................... | B60P 3/07 280/43.23 |
| 7,137,642 | B2 * | 11/2006 | Mitchell ................. | B60G 9/00 280/418.1 |
| 7,281,728 | B1 * | 10/2007 | Wayrynen ............. | B60P 3/1066 280/124.158 |
| 2006/0186616 | A1 * | 8/2006 | Rudiger ................. | B60G 3/14 280/6.15 |
| 2012/0020762 | A1 * | 1/2012 | Roose .................... | B60P 1/025 414/495 |
| 2012/0181760 | A1 * | 7/2012 | Catford .................. | B60G 5/00 280/43.18 |
| 2016/0264031 | A1 * | 9/2016 | Weldy ..................... | B60P 1/08 |

\* cited by examiner

*Primary Examiner* — Toan To
(74) *Attorney, Agent, or Firm* — Botkin & Hall, LLP

(57) ABSTRACT

A vehicle lowering system is provided having a movable arm that is connected to a vehicle through an upper link and a lower link. The upper and lower links pivot with respect to the vehicle on pivot points on one end and pivot with respect to the arm on pivot points at the opposite end. The spacing of the pivot points and the length of the upper and lower arm create an instant center, about which the movable arm pivots. An actuator is connected to the vehicle on one end and the movable part of the suspension on the opposite end. The actuator is movable between an extended and a retracted position. When the actuator moves between the extended and retracted position, the movable arm moves the vehicle between a raised and a lowered position.

19 Claims, 15 Drawing Sheets

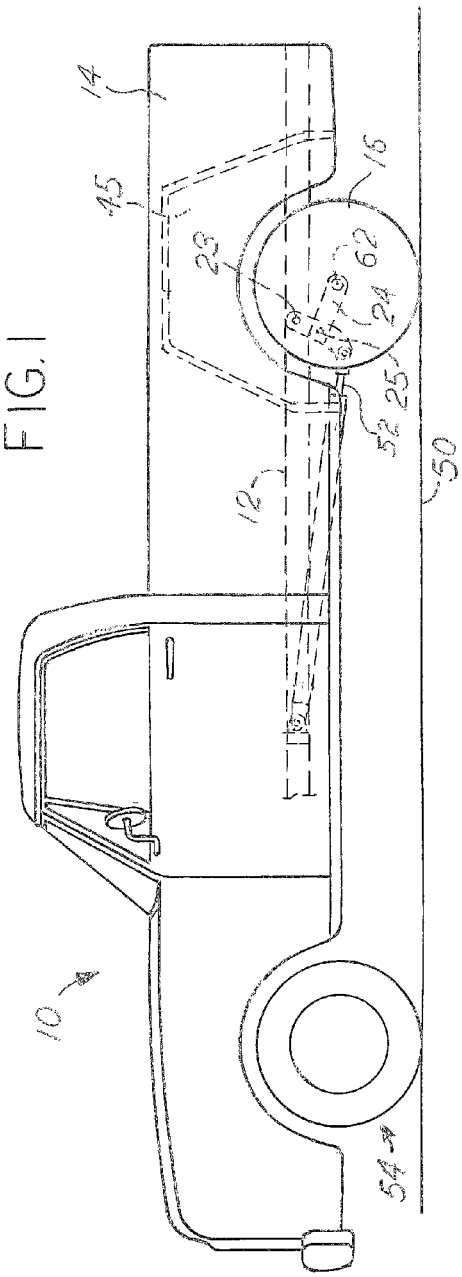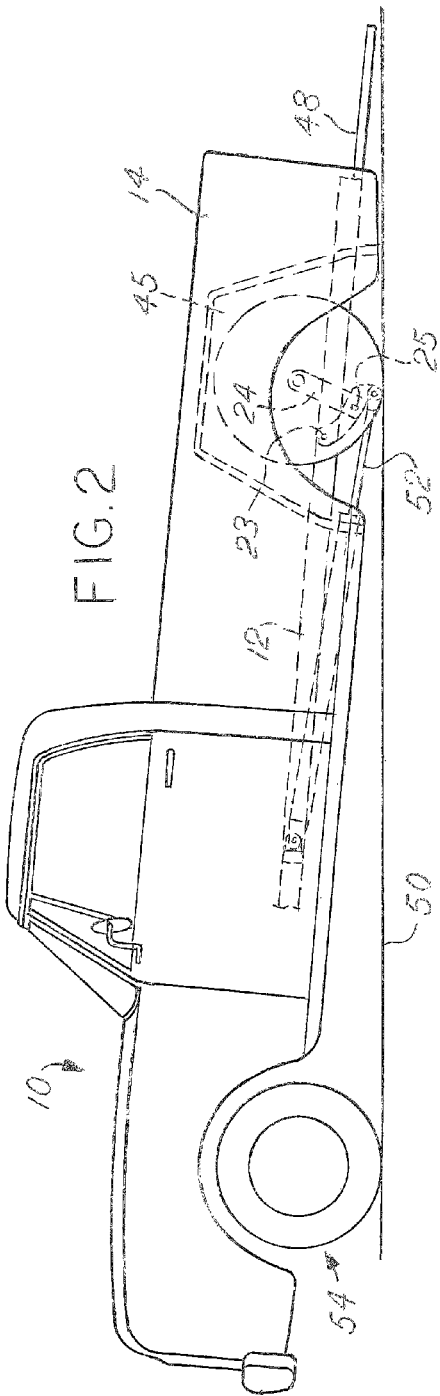

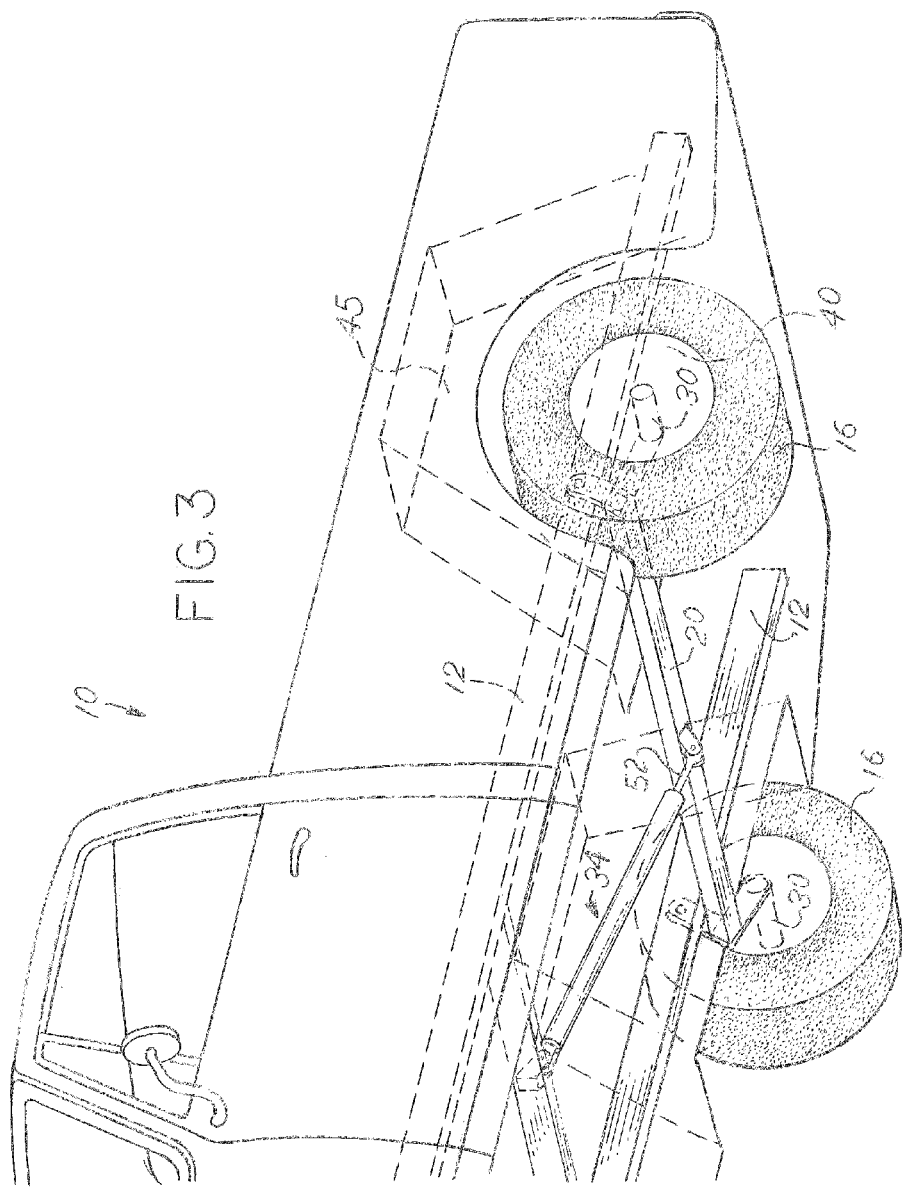

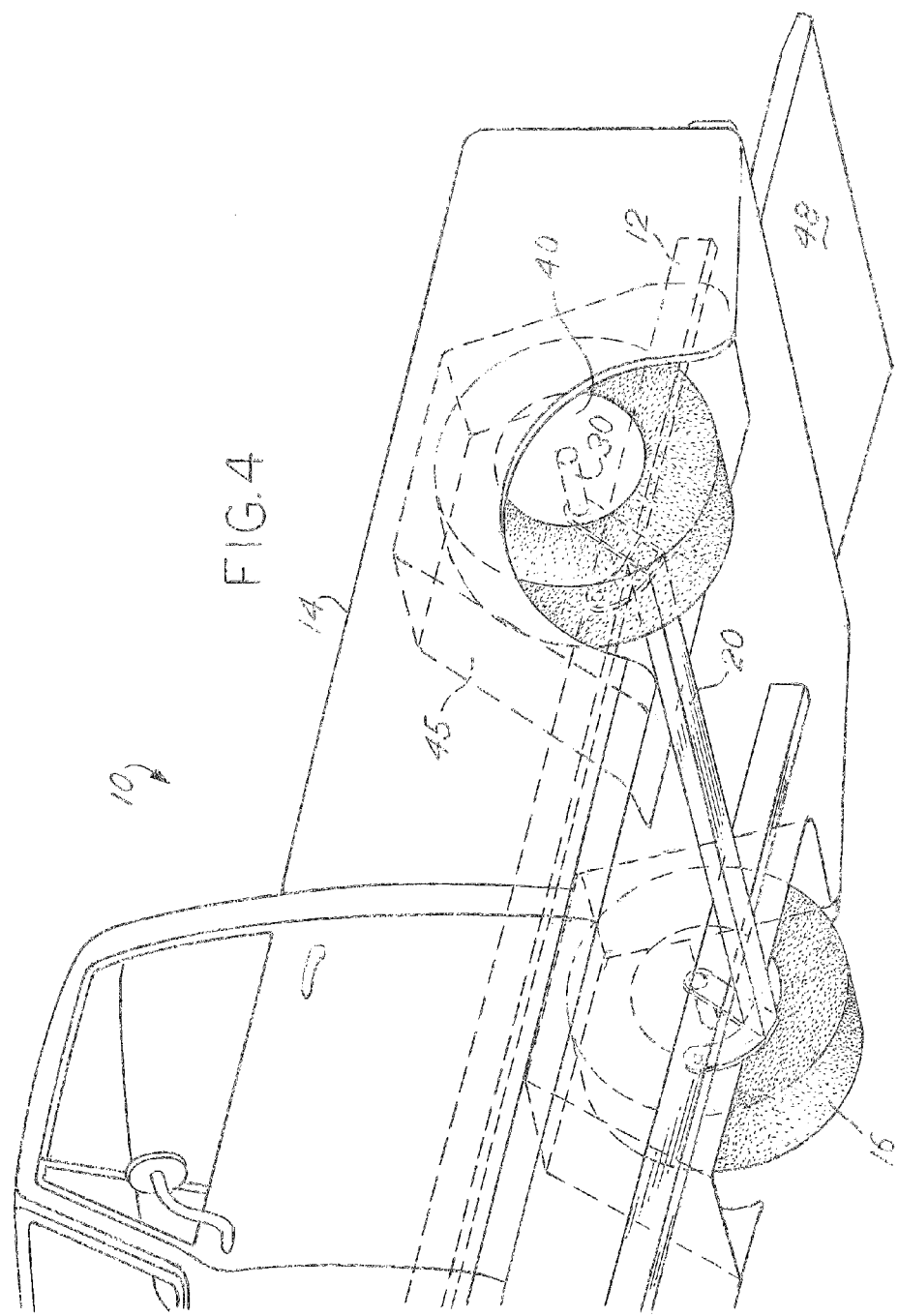

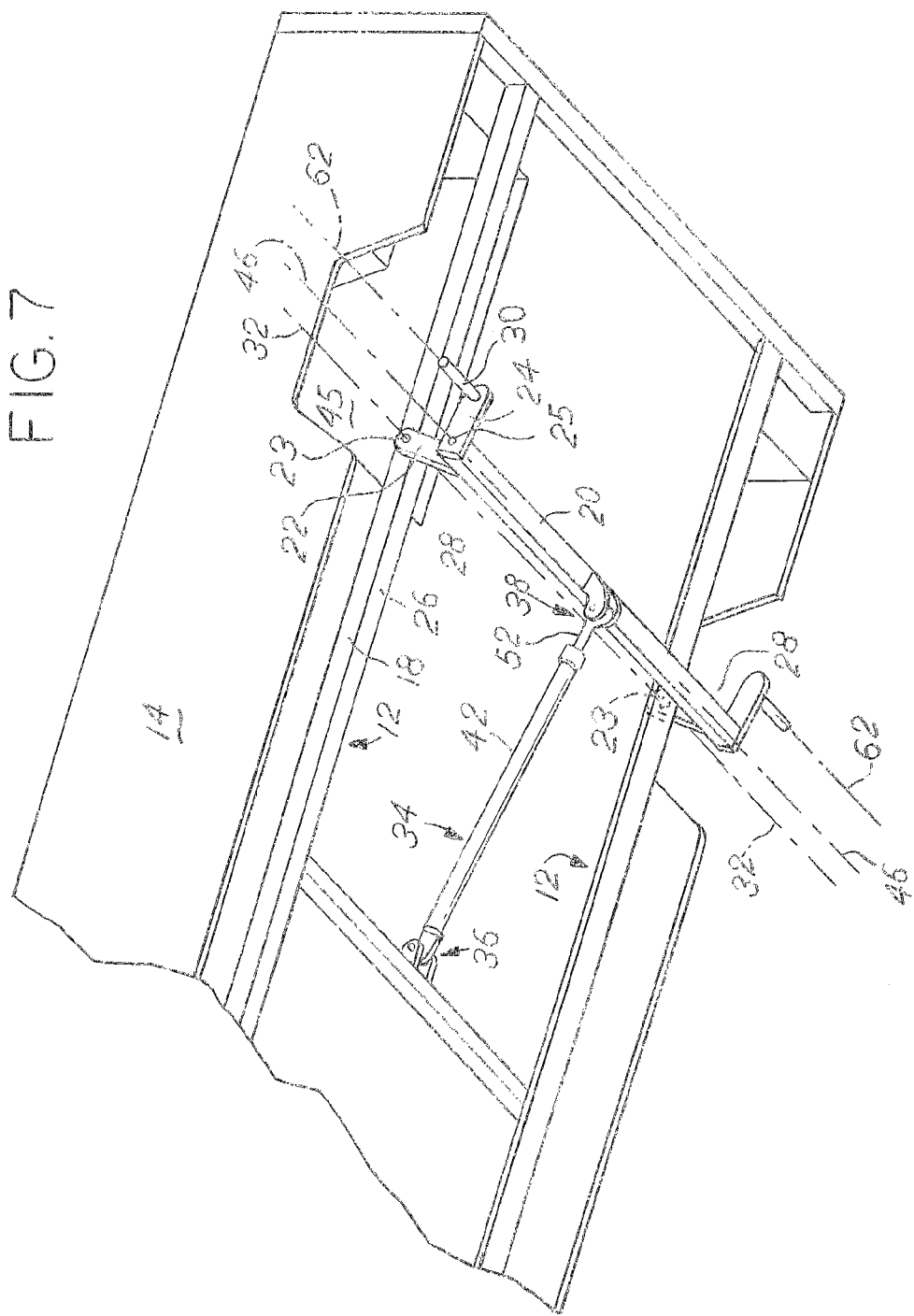

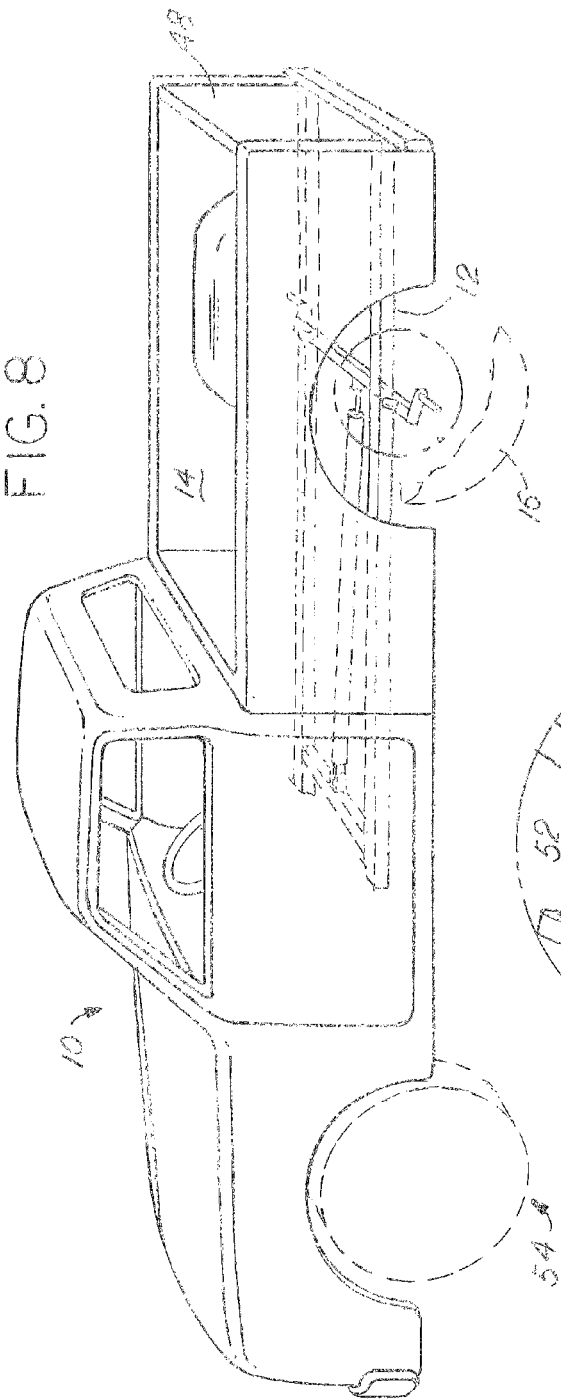
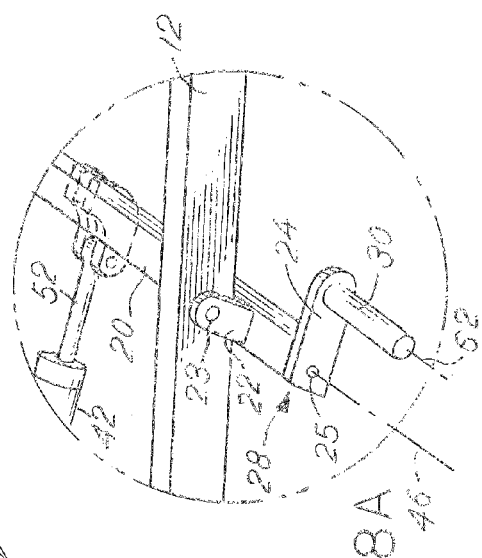

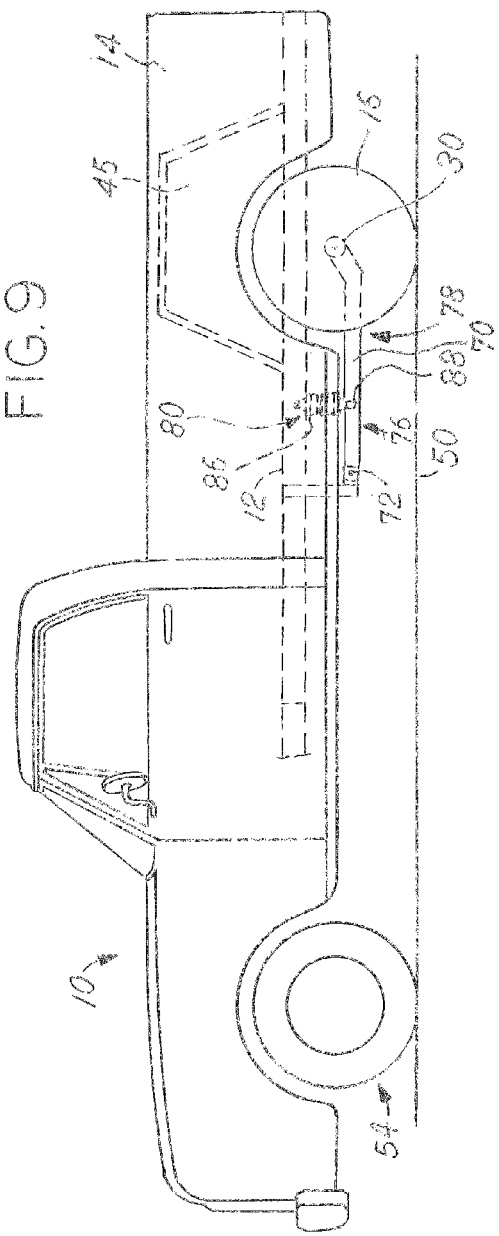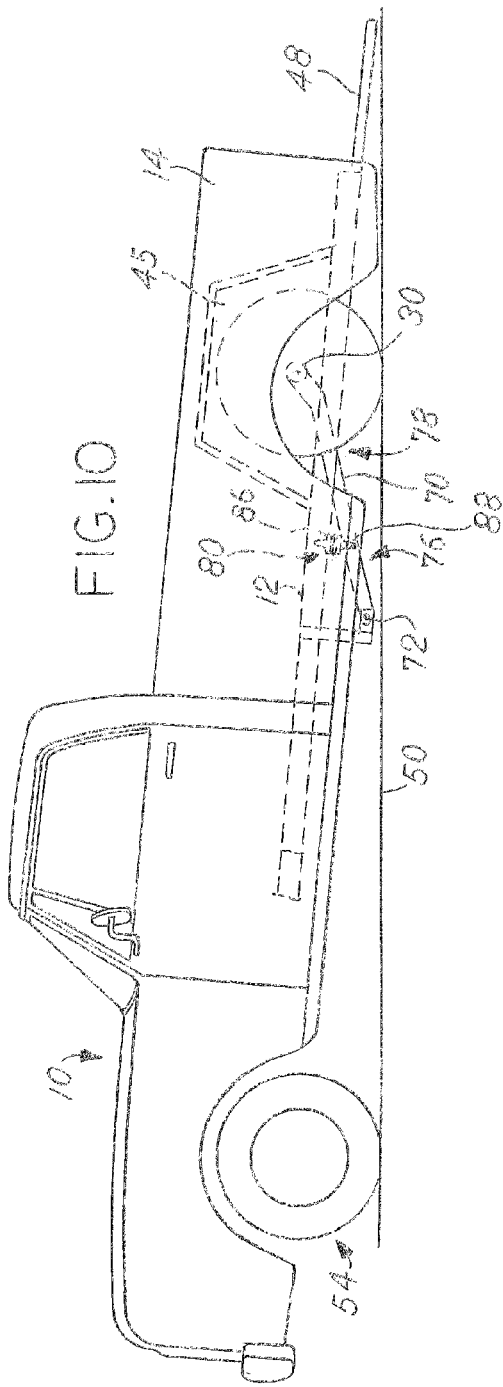

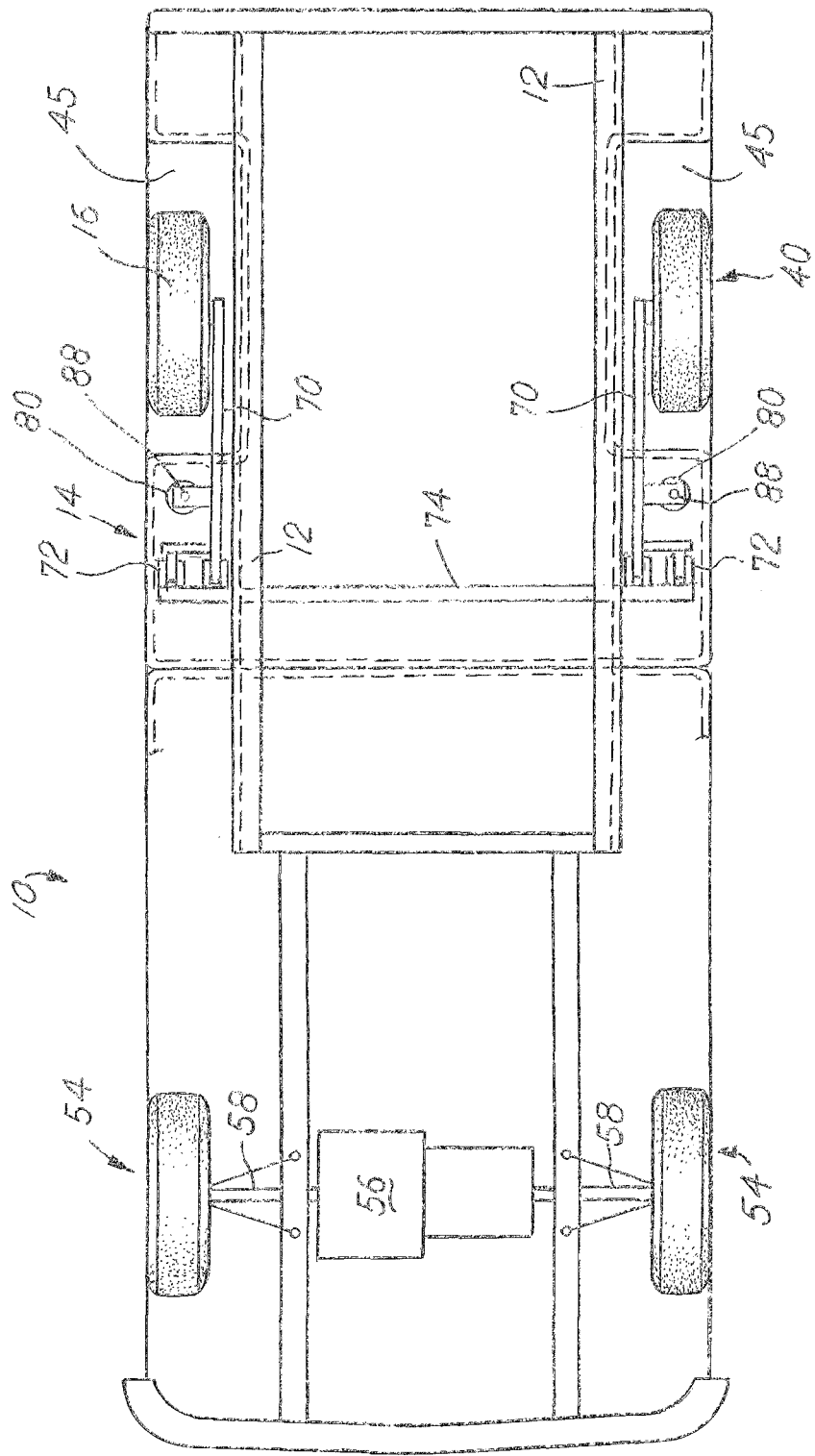

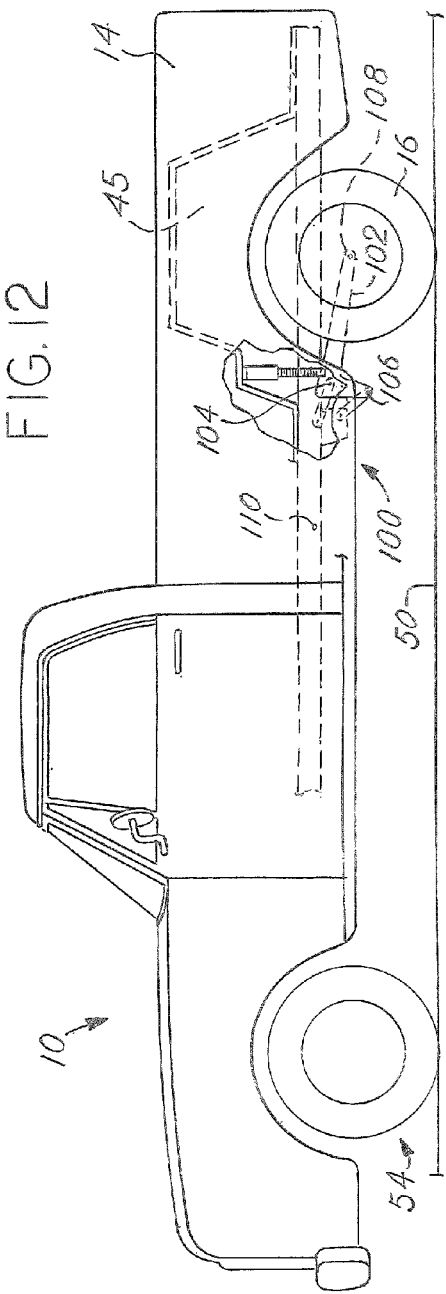
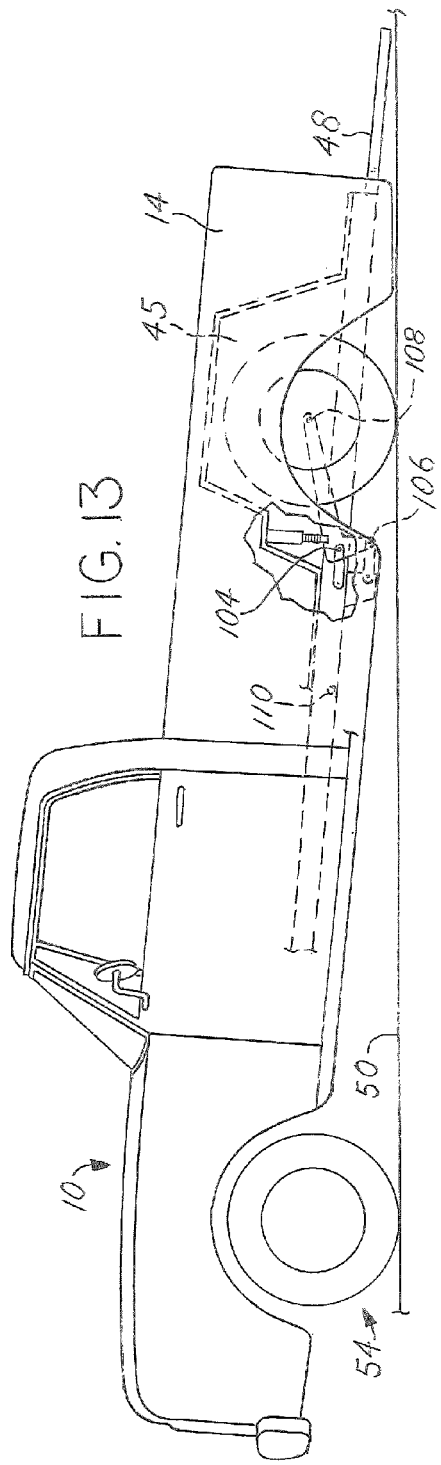

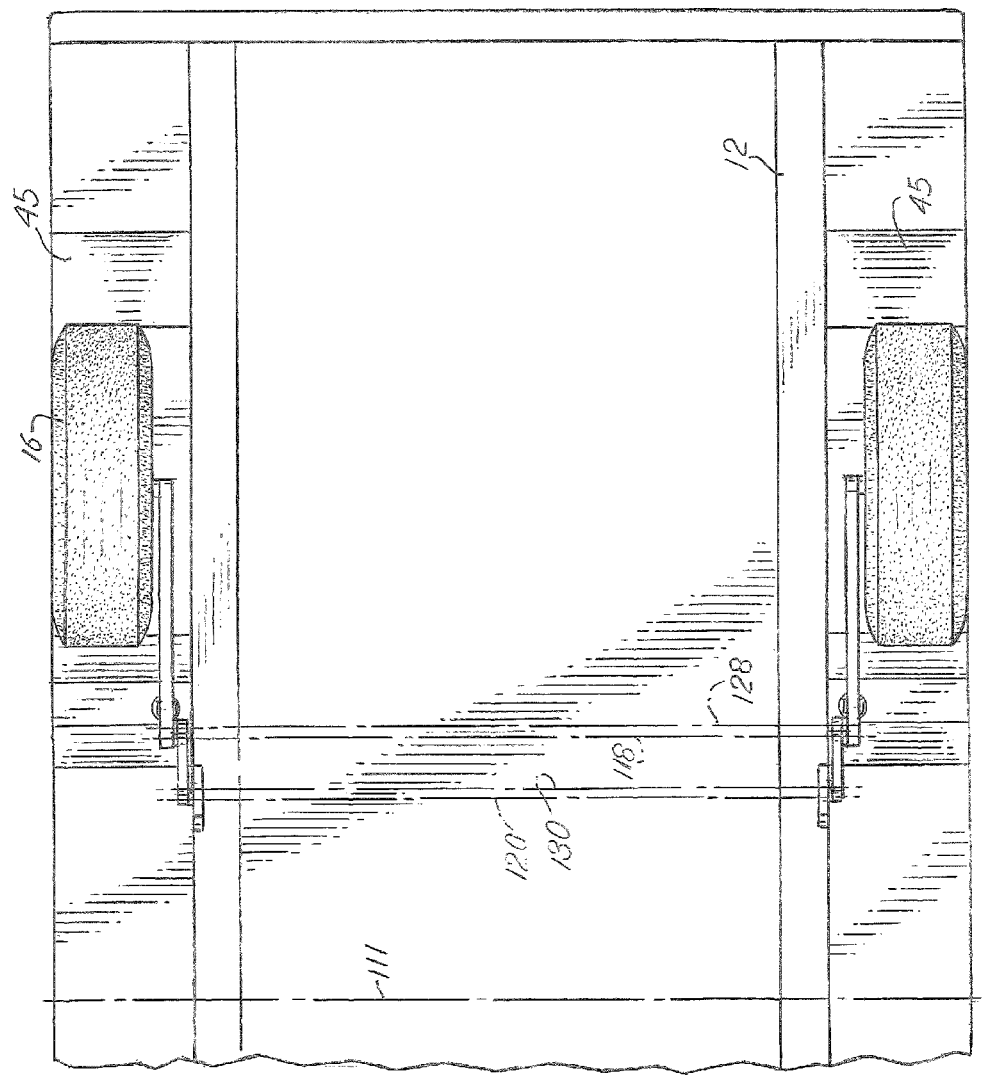

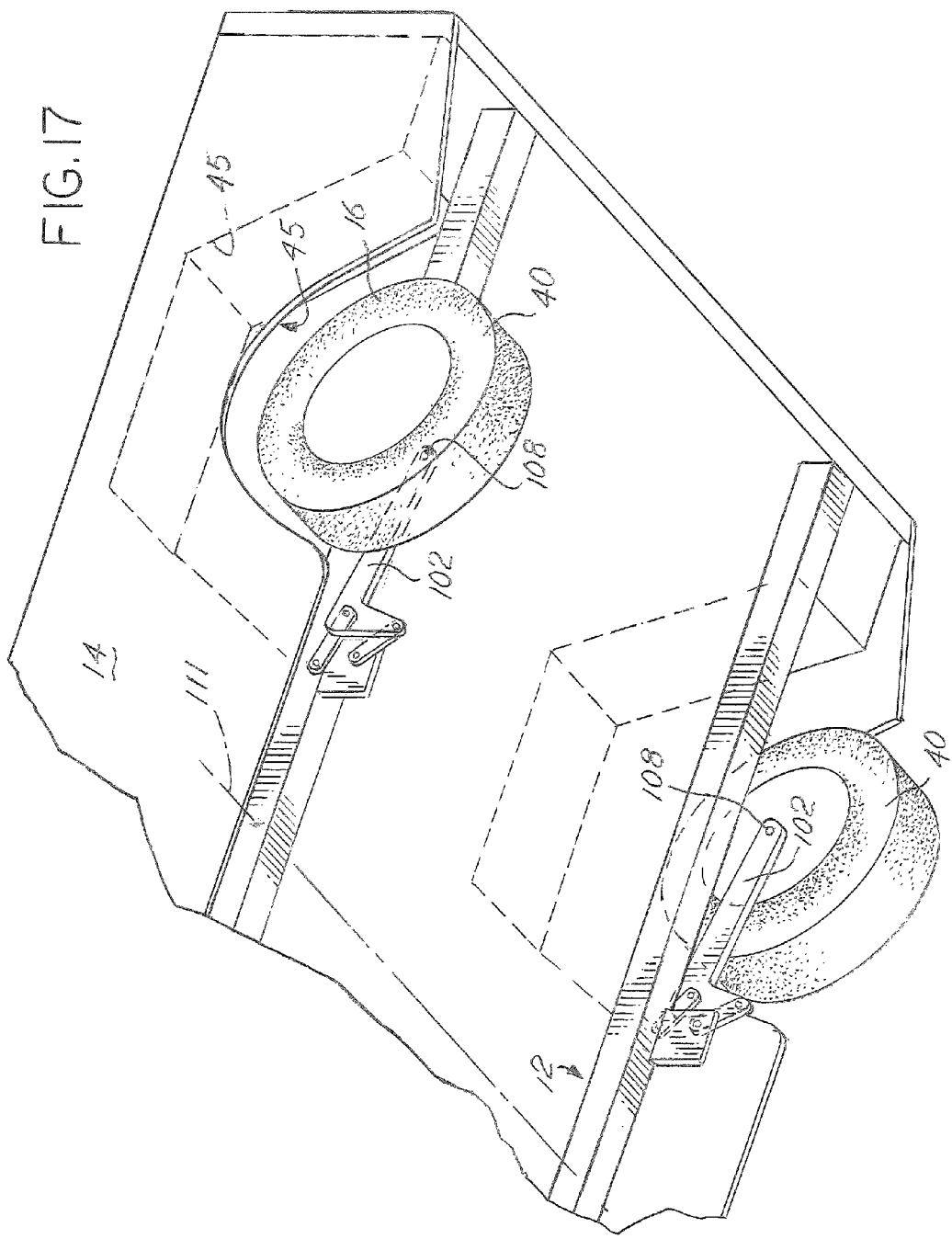

US 9,649,967 B2

VEHICLE LOWERING SYSTEM

CROSS REFERENCE TO RELATED APPLICATIONS

This application is a Continuation-in-Part of U.S. application Ser. No. 14/581,459 filed Dec. 23, 2014, the disclosure of which is hereby incorporated by reference.

BACKGROUND OF THE INVENTION

Having a separate trailer to haul objects that are heavy often requires the use of a ramp. Having a ramp on a trailer may require a steep incline. The longer the ramp leading onto a trailer, the less steep the incline. There is a tradeoff between shorter ramps with a steep incline or longer ramps and a relatively more gradual incline. Having a longer ramp may not always be possible due to its weight, or the lack of space to store such a ramp. Ideally, the towing vehicle could be lowered near the ground to eliminate the need for a separate trailer having a ramp. Vehicles are available that have adjustable height suspension systems, usually in the form of bladders that are inflated to raise the vehicle's suspension, but these systems have serious limitations in the amount of lowering and the height the cargo must reach in order to clear the suspension. For example, the amount of travel that these systems provide is insufficient to lower one end of the vehicle to the ground. Commonly available suspension systems for vehicles are physically limited in travel due to clearance issues between driveline members and the vehicle body. An improved vehicle lowering system is needed.

SUMMARY OF THE INVENTION

The present disclosure describes a suspension system that allows one end of a vehicle to raise or lower on command. The lowered position allows the user to load the vehicle (usually a pickup bed) by rolling, sliding, or carrying the payload up a gradual ramp that is generated by one end of the vehicle being lowered significantly. Ideally, the edge of the tailgate would touch or nearly touch the ground at the lowest position. Once the vehicle was loaded or unloaded, the suspension could be returned to the raised position in order to create enough ground clearance to safely drive the vehicle. Various ways to implement the suspension are discussed in this application. For example, one embodiment uses a common axle that pivots about a point that intersects the frame rails. The common axle has swing arms attached thereto to provide a movable suspension. The common axle is moved between the raised and lowered position with a single actuator affixed to the axle and the frame. A second type of suspension uses individual actuators that move each side of the suspension between the raised and lowered position. A variant of the second type utilizes an upper and lower link that allow a movable arm to pivot about a point that is offset from any of the moving parts of the suspension. This type of vehicle would have a lower payload platform, resulting in a lower center of gravity and increased safety.

BRIEF DESCRIPTION OF THE DRAWINGS

A preferred embodiment of this invention has been chosen wherein:

FIG. 1 is a side view of a pickup in its raised driving position;

FIG. 2 is a side view of the pickup in FIG. 1 in its lowered position;

FIG. 3 is a perspective view of the suspension shown in FIG. 1;

FIG. 4 is a perspective view of the suspension shown in FIG. 2;

FIG. 7 is a perspective bottom view of the pickup in FIG. 2;

FIG. 8 is a perspective view of the pickup shown in FIG. 1;

FIG. 8A is a partial view of FIG. 8;

FIG. 9 is a side view of an alternate embodiment in the driving position;

FIG. 10 is a side view of the embodiment of FIG. 9 in the lowered position;

FIG. 11 is a bottom view of the embodiment of FIG. 9;

FIG. 12 is a side view of the pickup in its raised driving position;

FIG. 13 is a side view of the pickup in FIG. 12 in its lowered position;

FIG. 14A is a partial view of the pickup in FIG. 14;

FIG. 17 is a bottom perspective view of the pickup in FIG. 12.

DESCRIPTION OF THE PREFERRED EMBODIMENT

Figure 5:
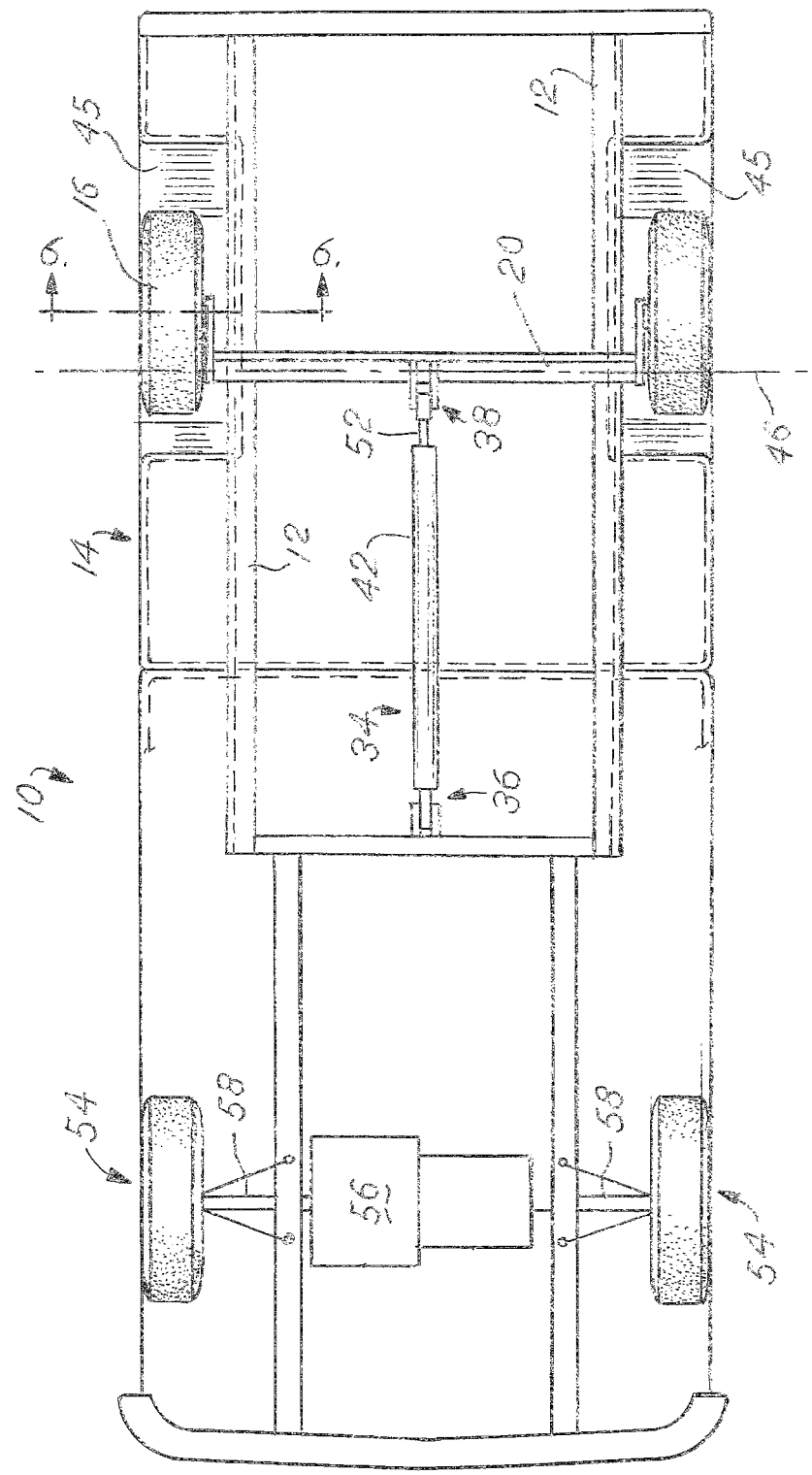
FIG. 5 is a bottom view of the pickup in FIG. 1.

The present invention is a vehicle 10 that has a system for lowering itself so that no separate ramp or lifting mechanism is necessary for loading or unloading a payload. In this case, a pickup has been used to illustrate the invention. A longitudinal axis extends from the front of the vehicle to the rear and is centered between the left side and right side. A vertical plane intersects the longitudinal axis. However, the vehicle 10 could be a van, flatbed truck, or other vehicle that would benefit from a portion being lowered to the ground 50 as is shown in FIG. 2. The vehicle 10 of the present invention has a conventional body that is indistinguishable from any other pickup. As is typical, the vehicle 10 has a frame 12 that runs along the undercarriage. However, trucks typically have a body-on-frame construction. The frame could be integral to the body, commonly referred to as a unibody to those skilled in the art. The frame 12 runs under a bed 14 or a cargo surface 44, FIG. 6 and is L-shaped with a horizontal portion 26 and a vertical portion 18. FIG. 1 shows the vehicle 10 with the front wheels 54 and a rear wheel 40 shown in dotted lines to indicate its position. Located underneath the cargo surface 44 is an axle 20. Axle 20 as shown in FIGS. 3 and 4 is a straight tube but can have other shapes. The axle 20 has a central axis 46, FIGS. 5 and 7. Arms 22 extend outwardly from the central axis 46 and are connected to the frame 12 and pivot about pivot point 23, FIGS. 1, 2 and 7, and welded near ends of the axle 20. Two or more pivot points line up to define a pivot axis 32. The pivot axis 32 is above the cargo surface 44. The pivot point 23 can be located inboard of the frame 12 where it protrudes upward through the cargo surface 44 or be located outboard of the frame 12 as shown in FIG. 7.

The axle 20 may include swing arms 24 that pivot about point 25 FIGS. 1, 2 and 7, which correspond with the central axis 46 of the axle 20. The swing arms 24 extend rearward of the axle 20 as shown in FIGS. 1 and 2, but can face forward and still function the same. The swing arms 24 are part of a torsion axle as commonly known in the art. The axle 20, combined with the swing arms 24, forms a standard torsion axle. The swing arms 24 resist torsional movement about the pivot point 25 that is near the terminal end 28 of the axle 20. The swing arms 24 are shown in an unloaded position in FIGS. 1, 7 and 8A. As the swing arm 24 supports weight and the torsion spring begins to twist, the swing arm 24 rotates about the central axis 46 of the axle 20 as shown in FIG. 7. At the end of the swing arms 24, spindles 30 are attached and spaced from the pivot point 25, FIG. 8A. The spacing of the spindle 30 from the first end 28 forms a swing arm 24 suspension. As shown in FIG. 7, the spindle 30 has a spindle axis 62 that is parallel to the central axis 46 of the axle 20. As each swing arm 24 has its own torsion spring, each is allowed to move independently of the other. The independent nature of the suspension assures good contact of the vehicle 10 to the ground 50 when parked or moving over uneven ground. Independent swing arm suspension is commonly known in the art. Wheels 40, with tires 16, rotate about the spindle axis 62, FIG. 7 and are supported by bearings as is commonly known in the art. However, those skilled in the art could reverse the direction at which the swing arms 24 extend from axle 20 and the suspension would still function as a torsional suspension. It is also possible to use alternative suspension instead of a swing arm.

A cylinder 34 has a body 42 with a first end 36 that is connected to a point forward of the axle 20 to the underside of the vehicle, FIG. 7. The first end 36 is attached to the vehicle with a pin and clevis connection so that it may pivot about its first end 36. The cylinder 34 also has a movable shaft 52 with a second end 38 that is connected to the axle 20 near its midpoint. Internal to the body 42 and affixed to the shaft 52 is a piston. Fluid displacement on both sides of the piston moves the piston and therefore the shaft 52. The second end 38 is connected with a pin and clevis connection. The shaft 52 is movable between a retracted position and an extended position. The retracted position is shown in FIGS. 1 and 3. The extended position of the cylinder 34 is shown in FIGS. 2 and 4. The cylinder 34 could be pneumatic, electric, or hydraulic. When the cylinder 34 is in its retracted position, the rear wheels 40 of the vehicle 10 will be in the position in which the vehicle will be driven, corresponding to a normal ride height. When in the retracted position, cylinder 34 and the vehicle will take advantage of the torsional suspension and the wheels will pivot about point 25 and act as an ordinary trailing arm torsional suspension. It is possible to locate the cylinder on the opposite side of the axle, where the extended position causes the vehicle to raise and the retracted position causes the vehicle to lower. The spindles 30 will be below the frame 12 as is typical due to the necessary ground clearance. When in the extended position, cylinder 34 and the vehicle will be in the lowered position as shown in FIGS. 2 and 4. In this position, the spindles 30 will be above the lowermost portion of the frame 12 and the cargo surface 44.

The separate swing arms 24 make it possible for the spindles 30 and thus the centers of the wheels 40 to be above the frame 12 because there is not an axle running directly in line with the spindles 30. The spindle 30 is located below the cargo surface 44 when the vehicle is in the driving position as is shown in FIGS. 1 and 3. When the vehicle is moving in reverse, the wheels 40 may encounter resistance. The resistance could create compression force on the cylinder 34, which is normally in compression. A cable or other lifting means could cause the axle to move unexpectedly, while the cylinder requires positive displacement to move the axle. The cylinder can provide force in tension or compression, unlike a cable or pulley system.

The axle 20 or cylinder 34 could have a lock to prevent movement of the axle 20 when the vehicle is in the driving position. In the event that stops are not present, failure of the cylinder could result in the vehicle lowering unintentionally. For safety or service, it is possible to instead add a lock to arms 22 or axle 20 in either the driving or loading position. Locking the lever arms 22 in the driving position prevents braking, acceleration, or the weight of the vehicle from being transmitted to the cylinder 34. Additionally, the addition of a lock allows the vehicle 10 to be secured for service of the system or any other part of the vehicle that would require immobilization of the lowering system.

The axle 20 provides adequate ground clearance to the cargo surface 44 when lowered and the ground 50 when raised. The wheels 40 when they are in the position shown in FIGS. 2 and 4, are retracted into wheel wells 45. Because the spindles 30 can be above the frame 12, the cargo surface 44 of the bed 14 can be as low as the bottom portion 26 FIGS. 6 and 7 of the frame 12 if necessary, as shown in FIG. 7. The configuration of the present invention allows for a significantly lower bed than would be possible if a typical rear wheel drive train were located between the wheels 40.

Because the axle 20, as shown in the embodiment, is not connected to a transmission in the vehicle 10, it cannot provide standard propulsion from an engine 56. Brakes can be installed over the spindle 30 to provide stopping force. It is also possible to integrate an electric motor on the spindle 30 such that electric propulsion is possible, as is commonly known in electric vehicle art. Standard propulsion from an engine 56 would be from another axle in the vehicle, such as the half shafts 58 attaching the front wheels 54 of the vehicle 10 to the power train as shown in FIG. 5.

Figure 6:
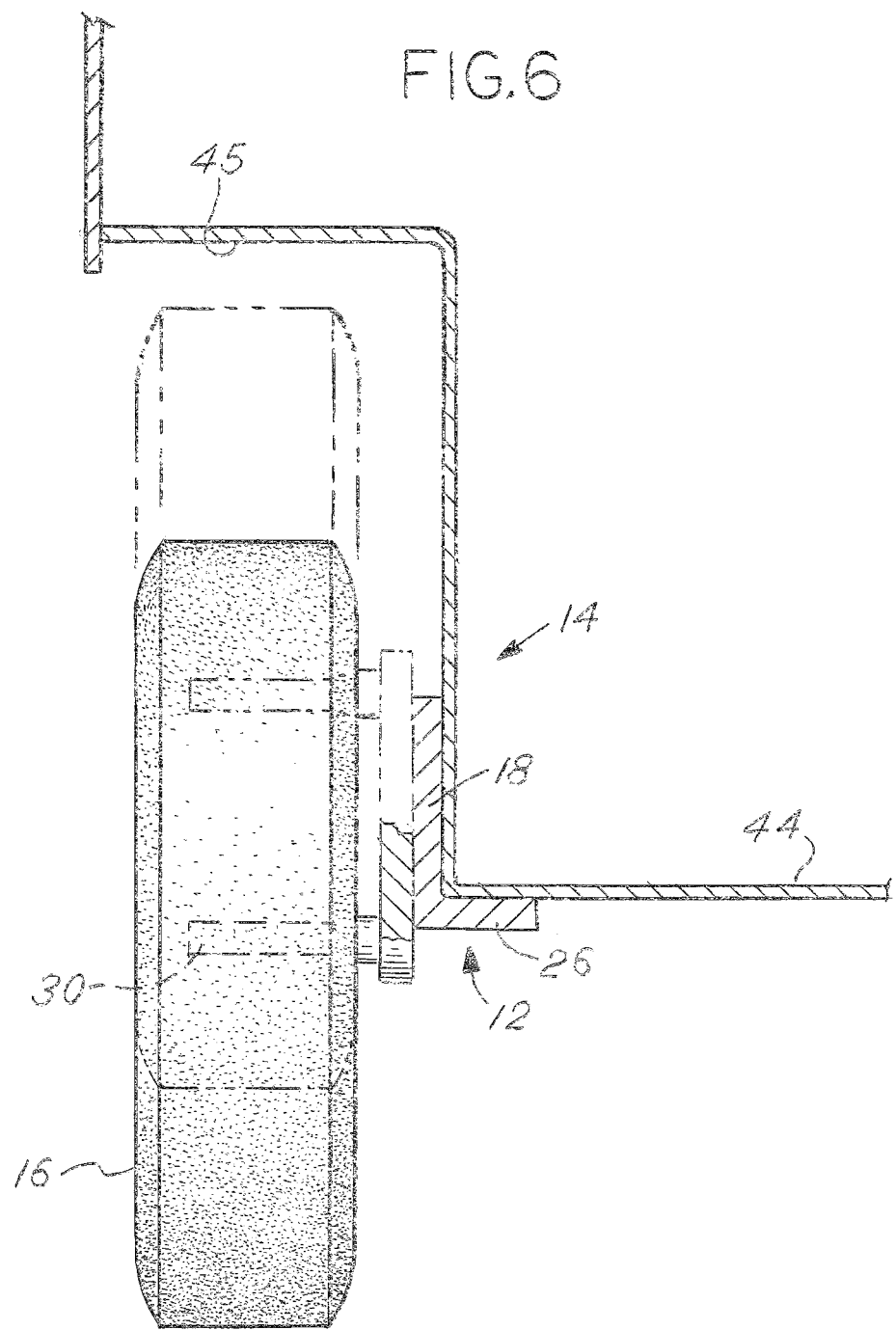
FIG. 6 is a section 6-6 of the pickup in FIG. 5 showing the raised and lowered position.

As shown in FIG. 4, the cargo surface 44, FIG. 6, may be lowered very near the ground. A tailgate 48 may be dropped as shown in FIG. 4 so that it meets the ground 50 on which the vehicle 10 rests. This forms an integral ramp that functions to retain cargo when not in use. It is also possible to locate the axle 20 and cargo surface 44 such that a tailgate is not necessary. Lowering the vehicle could bring the furthest end of the cargo surface 44 in contact with the ground.

As shown in FIGS. 9 and 10, it is possible to incorporate the suspension and lifting mechanism into one link 70. The link 70 has a first end 76 that is near a pivot point 72 where opposite sides of the vehicle are connected with an axle 74. The axle 74 ties both links together and it is contemplated that it serves as a stabilizing bar. On a second end 78, spindles 30 are attached. As shown in FIG. 9, when the vehicle 10 is in the driving position, the spindles 30 are above the cargo surface 44. When the vehicle 10 is in the lowered position, the spindles 30 are above the cargo surface 44. Instead of a single cylinder 34, the raising and lowering of the links 70 is from actuator 80. The actuator can be either pneumatic or hydraulic. As with the cylinder 34, displacement of fluid causes a piston or a diaphragm to move between the raised and lowered position. The actuator 80 is attached to the frame 12 on one end at a first end 86 and the link 70 on the second end 88. The actuator 80 can act as suspension in addition to raising and lowering the vehicle. It is contemplated that the link 70 is spring-loaded to the raised position and the actuator 80 is used to lower the vehicle. In that case, failure of the actuator would move the vehicle to the raised position.

Figure 14:
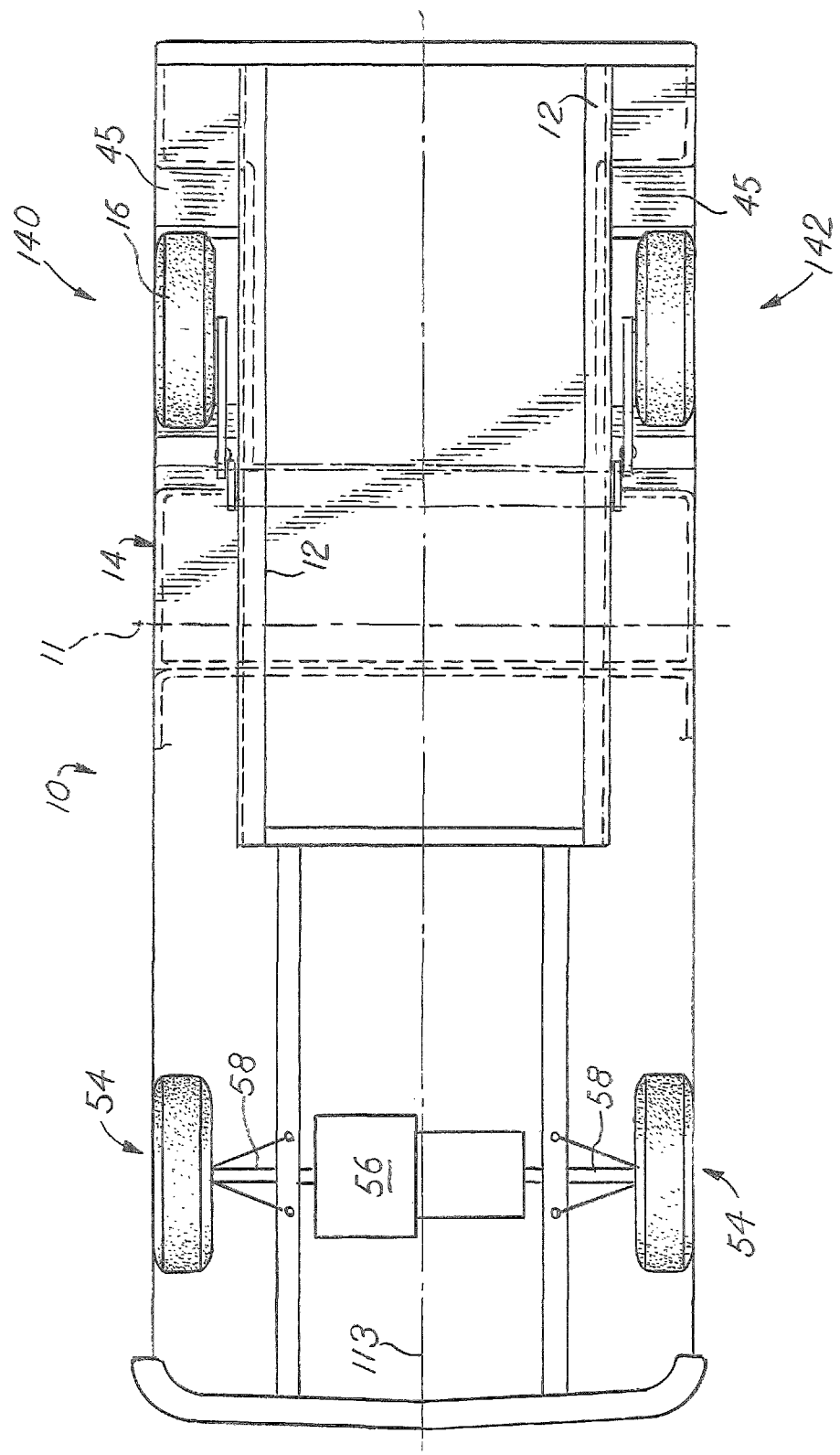
FIG. 14 is a bottom view of the pickup in FIG. 12.
Figure 15:
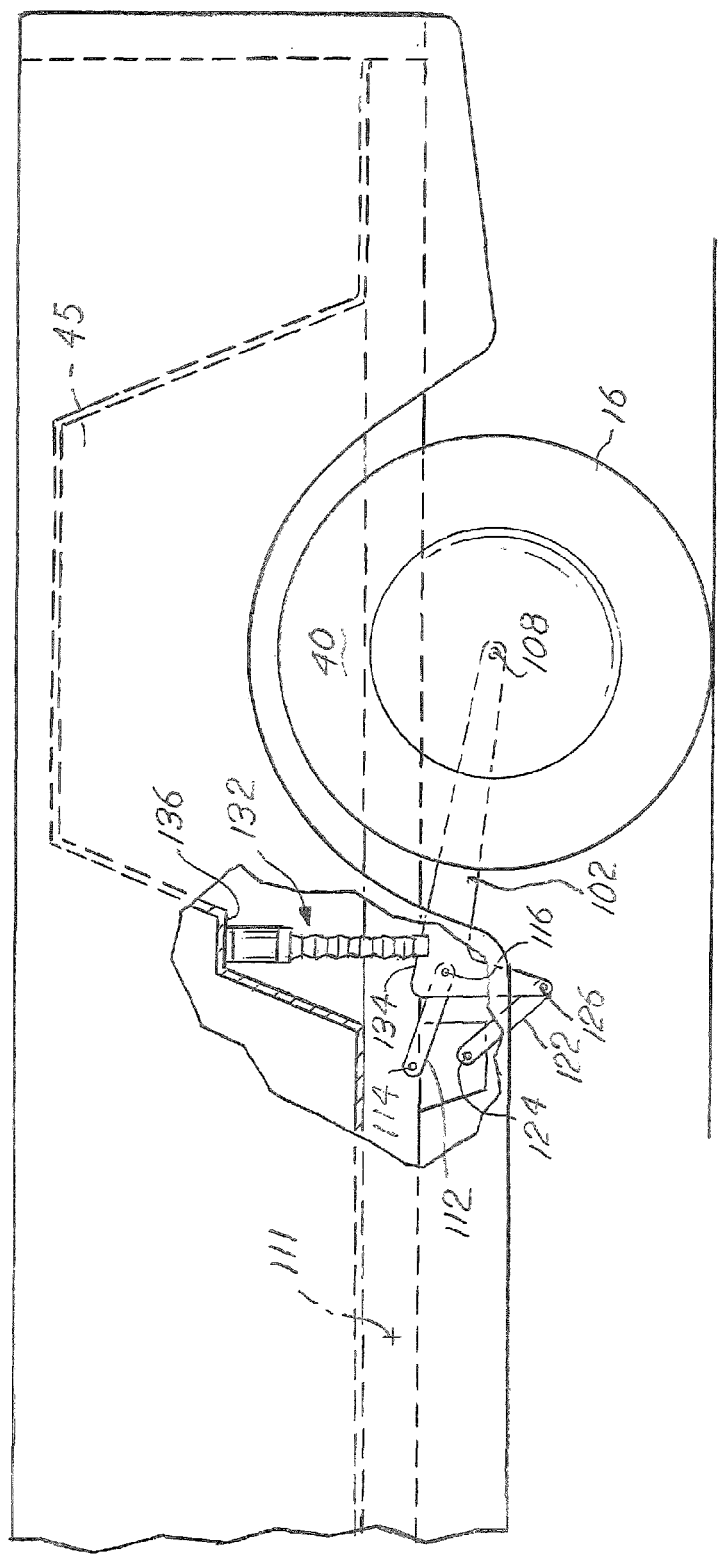
FIG. 15 is a partial view of FIG. 12.
Figure 16:
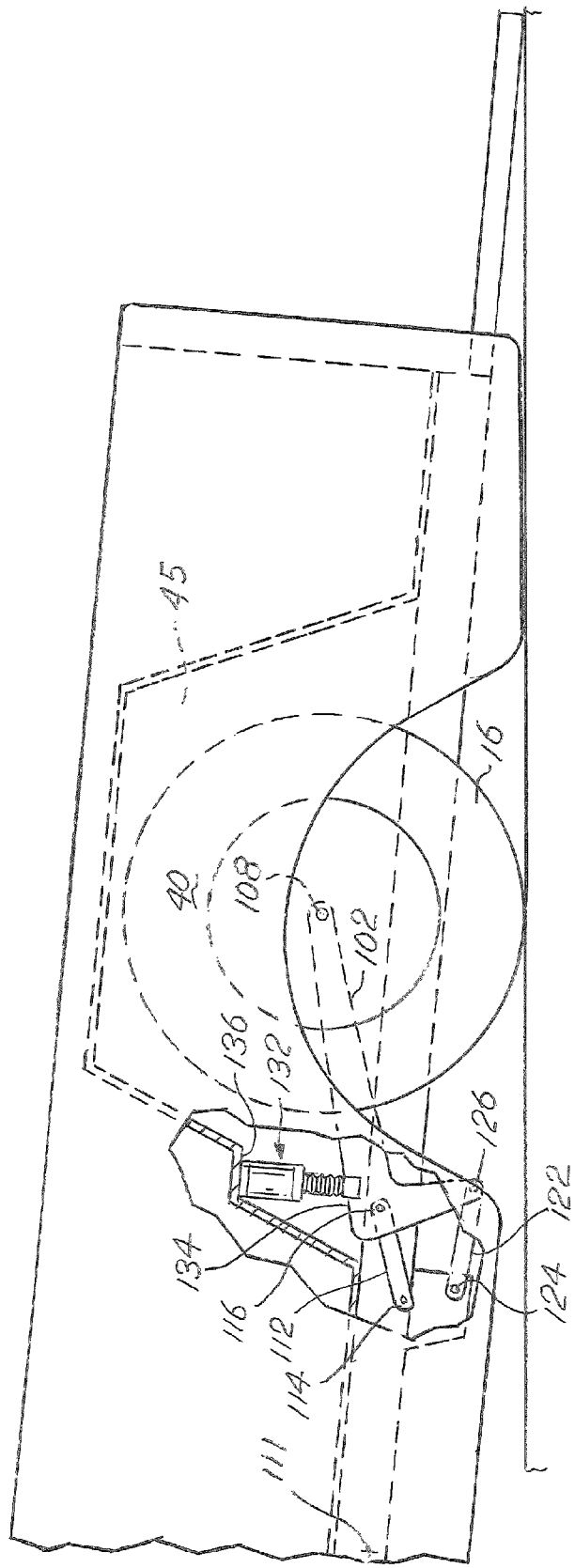
FIG. 16 is a partial view of FIG. 13.

An alternate embodiment of the lowering suspension 100 is shown in FIGS. 12-17. The suspension 100 is movable between a raised position as shown in FIGS. 12 and 15 and a lowered position as shown in FIGS. 13 and 16. A moving arm 102 is connected to the frame 12 at a proximal end through an upper link 112 and a lower link 122. There is a spindle 108 on a distal end of the moving arm 102 that supports the wheel 40 and tire 16 and allows them to rotate. The upper link 112 has an arm mounting end with a first pivot point 116 and a vehicle mounting end with a third pivot point 114. The upper link 112 rotates about the first pivot point 116 on an axis 118. The upper link 112 also rotates about the third pivot point 114 on another axis 120. The upper link 112 has a length defined by the distance between the first pivot point 116 and the third pivot point 114. Likewise, the lower link 122 has an arm mounting end with a second pivot point 126 and a vehicle mounting end with a fourth pivot point 124. The lower link 122 rotates about the second pivot point 126 on an axis 128. The lower link 122 also rotates about the fourth pivot point 124 on another axis 130. The first pivot point 116 is above the second pivot point 126 and both are located on the proximal end of the moving arm 102 The pivot points 116, 126 are closer to each other than either pivot point 116, 126 is to the spindle 108. The third pivot point 114 is above the fourth pivot point 124 and both are located on the frame 12 or vehicle body. The third pivot point 114 is shown as near the cargo surface 44, and it is contemplated that the pivot point is above the cargo surface 44. As shown in FIG. 16, the lower link 122 has a length defined by the distance between the second pivot point 126 and the fourth pivot point 124. The axes 118, 120, 128, 130 are shown as parallel and spaced from each other by respective distances. FIG. 14A shows the parallel spacing of the axes. Axes 118 and 126 are spaced farther from each other than axis 120 is spaced from 130, however it is contemplated that the axes have different spacing than what is shown. As shown, the links 112, 122 have lengths that are different, but it is contemplated that the link lengths are the same. The lengths of the links 112, 122 and the spacing of the axes 118, 120, 128, 130 cause the arm 102 to pivot about an instant center 110 that is offset from the suspension 100. As shown, this instant center 110 is located above the cargo surface 44 and frame 12. The instant center 110 is in different locations on the vehicle, depending on the position of the moving arm 102 between the raised and lowered positions. However, it is contemplated that the instant center 110 remains stationary between the raised and lowered positions. When the moving arm 102 moves to the lowered position, the distal end is closest to and adjacent the cargo surface 44. Depending on the lengths of the upper and lower link 112, 122 and locations of the pivot points 114, 124, 116, 126, the spindle 108 may move above the cargo surface 44 when the moving arm 102 is moved to the lowered position.

An actuator 132 has a first end 136 that is attached to the vehicle 10 or the frame 12. The opposite end 134 is attached to the moving arm 102 near the axis 118 or it is attached to one of the links 112, 122. The actuator 132 as shown is pneumatic. The actuator 132 typically is an air bag style as is used on heavy duty trucks and tractor-trailers. This is commonly called pneumatic springs and these are well known in the art. It moves from an extended position as shown in FIG. 15 to a retracted position as shown in FIG. 16. To move the actuator 132 to or from the extended position, a pump or tank moves fluid, typically air, into the actuator 132. This causes either a bellows to expand or a piston to move. A compressible fluid, such as air, gives the benefit of some level of shock absorption that absorbs surface irregularities while the vehicle is moving and allows suspension travel. As described, the actuator 132 is pneumatic but it is contemplated that the actuator is hydraulic, electric, or mechanical. As with the other embodiments of the suspension, it is contemplated that a locking device is used to fix the moving arm in the raised position, the lowered position, or any point between. It is further contemplated that the moving arm 102 is flexible in the vertical direction to allow suspension travel and shock absorption. The actuator 132 is shown affixed between the moving arm 102 and the vehicle, but the actuator 132 can be also affixed between the vehicle and one of the links 112, 122 or one of the pivot points 116, 126 on the moving arm 102. In this embodiment, the actuator would move the moving arm the same as the embodiment shown in FIGS. 15 and 16, but would exert force directly on the link 112, 122. Not shown in the FIGS, but commonly known in the art, is a braking system that is attached to the moving arm 102 around the spindle 108 that is used to slow the vehicle 10.

As shown in FIG. 14, the suspension as attached to the vehicle 10 has a left side 140 and a right side 142. The instant centers 110 between the left side 140 and the right side 142 form a pivot axis 111. As the suspension 100 moves, the instant centers 110 move, along with the pivot axis 111. The pivot axis 111 is shown as being perpendicular to a longitudinal axis 113, but the left side 140 moving with respect to the right side 142 could cause this axis 111 to be obliquely angled with respect to the longitudinal axis 113. The longitudinal axis 113 is aligned with a vertical plane.

One side 140 of the suspension is the mirror image of the other side 142. The two sides 140, 142 may be connected with a sway bar. The sway bar would pivot about an axis to couple the left side 140 to the right side 142. Sway bars are well known in the art to improve handling and stability. The suspension 100 is independent between the left and right side 140, 142, but it is contemplated that the sway bar is sufficiently rigid so as to restrict significant relative movement between the left 140 and right side 142. The center of the wheel of the one side 140 to the center of the wheel of the other side 142 defines a track width. As the suspension 100 moves between the raised and lowered position, the track width and distance of each wheel to the vertical plane of the vehicle 10 would remain constant.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A lowering suspension for a vehicle having driving wheels and a centrally located longitudinal axis aligned with a vertical plane, said vehicle having a cargo surface overlying a portion of a frame, said frame affixed to said vehicle, said lowering suspension comprising:

a moving arm parallel to said longitudinal axis and spaced therefrom, said moving arm having a proximal end and a distal end, said moving arm having a first pivot point spaced above a second pivot point, said first and second pivot points located on said proximal end, said moving arm having a spindle affixed to said moving arm near said distal end and spaced from said first and second pivot points, said spindle having a spindle axis;

a wheel rotatable with respect to said spindle axis;

a first link pivotally connected to said moving arm at said first pivot point and pivotally connected to said vehicle at a third pivot point that is fixed with respect to said vehicle;

a second link pivotally connected to said moving arm at said second pivot point and pivotally connected to said vehicle at a fourth pivot point that is fixed with respect to said vehicle;

said first pivot point spaced from said second pivot point by a first distance, said third pivot point spaced from said fourth pivot point by a second distance, said spindle spaced from said first and second pivot points by a third distance, said third distance greater than said first distance and said second distance;

an actuator having a first end and a second end, said first end affixed to said vehicle, said second end affixed to said moving arm, said actuator movable between a retracted position and an extended position, said actuator pivoting said moving arm between raised and lowered position about an instant center; and when said moving arm is in said lowered position, said spindle axis is located above said cargo surface and said distal end of said moving arm adjacent said cargo surface, when said moving arm is in said raised position, said spindle axis is located below said cargo surface, said moving arm remaining parallel to said vertical plane at all points between said raised and said lowered position.

2. The lowering suspension of claim 1, said vehicle having a left side and a right side, each of said sides having said lowering suspension, said lowering suspension of said left side being substantially mirror symmetrical to said right side about said vertical plane.

3. The lowering suspension of claim 2, said lowering suspension of said left side movably coupled to said right side through a sway bar, said sway bar pivotally connected to said vehicle.

4. The lowering suspension of claim 2, said vehicle having a track width defined by a distance between said wheel of said left side and said right side lowering suspension, said track width remaining substantially constant between said raised and said lowered position.

5. The lowering suspension of claim 1, said third pivot point located above said cargo surface.

6. The lowering suspension of claim 1, said actuator affixed to said moving arm between said spindle and said first pivot point.

7. The lowering suspension of claim 1, said actuator being an air spring.

8. A lowering suspension for a vehicle having driving wheels and a centrally located longitudinal axis aligned with a vertical plane, said vehicle having a cargo surface overlying a portion of a frame, said frame affixed to said vehicle, said lowering suspension comprising:

a moving arm parallel to said longitudinal axis and spaced therefrom, said moving arm having a proximal end and a distal end, said moving arm having a first pivot point spaced above a second pivot point, said first and second pivot points located on said proximal end, said moving arm having a spindle with a spindle axis, said spindle affixed to said moving arm near said distal end and spaced from said first and second pivot points;

a wheel rotatable with respect to said spindle axis;

a first link pivotally connected to said moving arm at said first pivot point and pivotally connected to said vehicle at a third pivot point that is fixed with respect to said vehicle;

a second link pivotally connected to said moving arm at said second pivot point and pivotally connected to said vehicle at a fourth pivot point that is fixed with respect to said vehicle;

an actuator having a first end and a second end, said first end affixed to said vehicle, said second end affixed to said suspension, said actuator movable between a retracted position and an extended position, said actuator pivoting said moving arm between raised and lowered position; and when said moving arm is in said lowered position, said spindle axis is located above said cargo surface, when said moving arm is in said raised position, said spindle axis is located below said cargo surface.

9. The lowering suspension of claim 8, said vehicle having a left side and a right side, each of said sides having said lowering suspension, said lowering suspension of said left side being substantially mirror symmetrical to said right side about said longitudinal axis of said vehicle.

10. The lowering suspension of claim 9, said first pivot point spaced from said second pivot point by a first distance, said third pivot point spaced from said fourth pivot point by a second distance, said spindle spaced from said first and second pivot points by a third distance, said third distance greater than said first distance and said second distance.

11. The lowering suspension of claim 9, said lowering suspension of said left side movably coupled to said right side through a sway bar, said sway bar pivotally connected to said vehicle.

12. The lowering suspension of claim 9, said vehicle having a track width defined by a distance between a wheel connected to said spindle of said left side and said right side lowering suspension, said track width remaining substantially unchanged between said raised and said lowered position.

13. The lowering suspension of claim 8, said actuator affixed to said moving arm between said spindle and said first pivot point.

14. The lowering suspension of claim 8, said actuator affixed to said suspension nearer said first pivot point than said spindle.

15. The lowering suspension of claim 8, said distal end of said moving arm adjacent said cargo surface when said lowering suspension is in said lowered position.

16. The lowering suspension of claim 8, said spindle spaced from said first and second pivot points by a third distance, said third distance greater than said first distance and said second distance.

17. The lowering suspension of claim 8, said actuator being an air spring.

18. A lowering suspension for a vehicle having driving wheels, said lowering suspension comprising:

a cargo surface overlying a portion of a frame, said frame affixed to said vehicle;

a moving arm having a proximal end and a distal end, said moving arm having a first pivot point spaced above a second pivot point, said first and second pivot points located on said proximal end, said moving arm having a spindle with a spindle axis, said spindle affixed to said moving arm near said distal end and spaced from said first and second pivot points;

a first link pivotally connected to said moving arm at said first pivot point and pivotally connected to said vehicle at a third pivot point that is fixed with respect to said vehicle;

a second link pivotally connected to said moving arm at said second pivot point and pivotally connected to said vehicle at a fourth pivot point that is fixed with respect to said vehicle;

said first pivot point spaced from said second pivot point by a first distance, said third pivot point spaced from said fourth pivot point by a second distance;

an air spring actuator having a first end and a second end, said first end affixed to said vehicle, said second end affixed to said suspension, said actuator movable between a retracted position and an extended position, said air spring actuator moving said moving arm between raised and lowered position about an instant center; and when said moving arm is in said lowered position, said spindle axis is located above said cargo surface, when said moving arm is in said raised position, said spindle axis is located below said cargo surface.

19. The lowering suspension of claim 18, said distal end of said moving arm adjacent said cargo surface when said suspension is in said lowered position.

\* \* \* \* \*